(12) United States Patent
Kim

(10) Patent No.: US 7,330,226 B2
(45) Date of Patent: Feb. 12, 2008

(54) REFLECTION-TYPE LIQUID CRYSTAL DISPLAY DEVICE AND METHOD OF FABRICATING THE SAME

(75) Inventor: Young Seok Kim, Kyonggi-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/745,501

(22) Filed: Dec. 29, 2003

(65) Prior Publication Data

US 2004/0135944 A1     Jul. 15, 2004

(30) Foreign Application Priority Data

Apr. 15, 2003   (KR) .................. 10-2003-0023650

(51) Int. Cl.
*G02F 1/1335*      (2006.01)
(52) U.S. Cl. ...................... 349/106; 349/113
(58) Field of Classification Search ............... 349/106
See application file for complete search history.

(56) References Cited

U.S. PATENT DOCUMENTS 5,131,736 A * 7/1992 Alvarez .................. 359/886
5,610,741 A   3/1997 Kimura
5,729,313 A * 3/1998 Mitsui .................... 349/106

FOREIGN PATENT DOCUMENTS

JP     11-101974      4/1999
JP     2000-056125    2/2000

OTHER PUBLICATIONS

Johnson et al., "Synthesis and optical properties of opal and inverse opal photonic crystals". 2001, Elsevier Science, p. 1.*

* cited by examiner

*Primary Examiner*—David Nelms
*Assistant Examiner*—Richard H Kim
(74) *Attorney, Agent, or Firm*—Morgan, Lewis & Bockius LLP

(57) ABSTRACT

A reflection-type liquid crystal display (LCD) device includes lower and upper substrates facing each other, a color filter layer including a plurality of photonic crystal balls on the lower substrate for reflecting light having specific wavelengths, gate and data lines on the upper substrate crossing each other to define a pixel region, a thin film transistor at a crossing point of the gate and data lines, a pixel electrode within the pixel region electrically connected to the thin film transistor, and a liquid crystal layer between the lower and upper substrates.

8 Claims, 7 Drawing Sheets

REFLECTION-TYPE LIQUID CRYSTAL DISPLAY DEVICE AND METHOD OF FABRICATING THE SAME

The present invention claims the benefit of Korean Patent Application No. P2003-23650, filed in Korea on Apr. 15, 2003 which is hereby incorporated by reference.

BACKGROUND OF THE INVENTION

1. Field of the Invention

The present invention relates to a liquid crystal display (LCD) device and a method of fabricating an LCD device, and more particularly, to a reflection-type LCD device and a method of fabricating a reflection-type LCD device.

2. Discussion of the Related Art

As demand for various display devices increases, efforts have been made to develop liquid crystal display (LCD) devices, plasma display panel (PDP) devices, electroluminescent display (ELD) devices, and vacuum fluorescent display (VFD) devices. Among these various flat display devices, the LCD devices have been commonly used as substitutes for cathode ray tube (CRT) devices due to their thin profiles, light weight, and low power consumption. In addition to mobile-type LCD devices, such as displays for notebook computers, the LCD devices have been developed for use in computer monitors and televisions to receive and display broadcasting signals.

Despite various technical developments within the LCD device technology, improved image quality of the LCD devices has been lacking. Accordingly, in order to use the LCD devices as general displays, providing images having high resolution and high luminance with a large-sized screen must be attained while still maintaining their thin profile, light weight, and low power consumption.

In general, an LCD device includes an LCD panel for displaying images and a driving part for supplying driving signals to the LCD panel. In addition, the LCD panel includes first and second glass substrates bonded to each other at a predetermined interval with a liquid crystal layer injected between the first and second glass substrates. The first glass substrate (i.e., TFT array substrate) includes a plurality of gate and data lines, a plurality of pixel electrodes, and a plurality of thin film transistors. The plurality of gate lines are formed along a first direction at fixed intervals, and the plurality of data lines are formed along a second direction perpendicular to the gate lines at fixed intervals, thereby defining a plurality of pixel regions. Accordingly, the plurality of pixel electrodes are formed within the pixel regions in a matrix configuration, and the plurality of thin film transistors are switched according to signals provided to the gate lines so as to supply signals of the data lines to the respective pixel electrodes.

The second glass substrate (i.e., color filter substrate) includes a black matrix layer for shielding portions of the first glass substrate, except for the pixel regions, from light. In addition, a red (R), green (G), and blue (B) color filter layer is provided for displaying various light colors, and a common electrode is used for producing an image.

The LCD device is driven according to optical anisotropy and polarizing characteristics of liquid crystal material. The liquid crystal material includes liquid crystal molecules, wherein each liquid crystal molecule has a long and thin structure to control an alignment direction of the liquid crystal molecules by inducing an electric field to the liquid crystal material. By controlling the alignment direction of the liquid crystal molecules, light passing through the liquid crystal material is refracted according to the alignment direction of the liquid crystal molecules by the optical anisotropy of the liquid crystal material, thereby displaying images.

The LCD device is commonly classified into transmission type LCD devices that display images by using an additional light source, such as a backlight, and reflection-type LCD devices that display images by making use of ambient light. The reflection-type LCD devices have advantageous operational characteristics that result in low power consumption, thereby producing high quality images in an outdoor environment. In addition, the reflection-type LCD devices have thin profiles and light weight since they do not require an additional light source, such as the backlight.

However, the present reflection-type LCD devices may not be able to effectively cope with the demands for high resolution and improved color realization ratios since their display screens are displayed in a dark state. That is, the current reflection-type LCD devices are commonly used for displaying limited types of images, such as numbers and simple characters. Accordingly, in order to incorporate the reflection-type LCD device in various display devices, it is necessary to improve reflectivity, resolution, and color realization ratios. In addition, the reflection-type LCD devices need to obtain rapid response times and high contrast ratios.

The current reflection-type LCD devices have been developed with improved reflectivity of a reflective electrode, and have a super aperture technology. For example, U.S. Pat. No. 5,610,741 discloses a reflection-type LCD device that improves reflectivity by forming minute bumps on the reflective electrode, and is hereby incorporated by reference.

FIG. 1 is a plan view of a reflection type LCD device according to the related art, and FIG. 2 is a cross sectional view along I-I' of FIG. 1 according to the related art. In FIG. 1, the reflection-type LCD device includes a lower substrate 10 (in FIG. 2) having gate and data lines 11 and 12 crossing each other, a pixel electrode 13, and a thin film transistor that includes a gate electrode 11a, a semiconductor layer 14, and source/drain electrodes 12a and 12b formed at a crossing point of the gate and data lines 11 and 12. Accordingly, the gate and data lines 11 and 12 define a pixel region by crossing each other, and the pixel electrode 13 is formed within the pixel region. In FIG. 1, the thin film transistor functions as a switching device, wherein the thin film transistor operates to supply data signals to a reflective electrode 13 by switching signals supplied to the gate electrode 11a. In addition, the reflective electrode 13 is formed of an opaque metal material having great reflectivity, such as Al or Ag, so as to reflect the light incident through an upper substrate 20 (in FIG. 2).

In FIG. 2, the gate line 11 is formed on the lower substrate 10 to extend along a first direction, wherein the gate electrode 11a protrudes from the gate line 11. Then, a gate insulating layer 15 is formed along an entire surface of the lower substrate 10 including the gate electrode 11a. Next, the island-shaped semiconductor layer 14 is formed on the gate insulating layer 15 to overlap the gate electrode 11a. Then, the data line 12 is formed to extend along a second direction perpendicular to the gate line 11, wherein the source/drain electrodes 12a and 12b are formed to overlap both sides of the semiconductor layer 14. Accordingly, the source electrode 12a protrudes from the data line 12, and the drain electrode 12b is formed at a predetermined interval from the source electrode 12a.

Next, a passivation layer 16 is formed along an entire surface of the lower substrate 10 including the source/drain electrodes 12a and 12b, and is selectively removed, thereby forming a contact hole exposing a portion of the drain electrode 12b. Then, a reflective metal layer is deposited thereon, and patterned so as to form the reflective electrode 13 within the pixel region, and is formed to be electrically connected with the drain electrode 12b. Accordingly, the reflective electrode 13 functions to reflect any external light and serves as the pixel electrode of receiving the data signals from the drain electrode 12b.

Next, the upper substrate 20 includes a black matrix layer 21 for shielding portions of the lower substrate 10, except for the pixel regions, from the light and a color filter layer 22 for producing colored light within the pixel regions. The color filter layer 22 is formed of a photosensitive resin that absorbs light. Then, a common electrode 23 is formed along an entire surface of the upper substrate 20 including the color filter layer 22.

Next, a light-diffusion plate 24 is formed at a rear portion of the upper substrate 20. Thus, a reflective function of the reflective electrode 13 is strengthened by the light-diffusion plate 24, thereby improving light efficiency. However, it is difficult to improve the luminance of the LCD device using the light reflected and emitted by the reflective electrode 13. Accordingly, the light-diffusion plate 24 is additionally formed on the upper substrate 20 to obtain high luminance by making use of the light-diffusion characteristics of the light-diffusion plate 24.

Next, ball spacers (not shown) are spread onto the lower and upper substrates 10 and 20. Then, the lower and upper substrates 10 and 20 are bonded to each other, and a liquid crystal layer 30 is formed between the lower and upper substrates 10 and 20.

However, the reflection-type LCD device requires the additional light-diffusion plate 24, thereby making it impossible to obtain an ultra-thin LCD device and decreasing manufacturing costs. In order to overcome these problems, a reflection-type LCD device has been developed that includes grooves in the reflective electrode without using the light-diffusion plate, thereby improving light efficiency of the LCD device.

FIG. 3 is a plan view of another reflection-type LCD device according to the related art, and FIG. 4 is a cross sectional view along II-II' of FIG. 3 according to the related art. In FIGS. 3 and 4, a reflection-type LCD device includes a lower substrate 10 having gate and data lines 11 and 12, a reflective electrode 13, and a thin film transistor, wherein the gate and data lines 11 and 12 are formed perpendicular to each other to define a pixel region. The reflective electrode 13 is formed within the pixel region, and the thin film transistor includes a gate electrode 11a, a semiconductor layer 14, and source/drain electrodes 12a and 12b formed at a crossing point of the gate and data lines 11 and 12. In addition, a plurality of grooves 18 are formed in a surface of the reflective electrode 13 to reflect any external light. However, improving the luminance is problematic since the number of the grooves formed in one reflective electrode is limited.

Accordingly, the reflection-type LCD device has the following disadvantages. First, the reflection-type LCD device makes use of external light having low luminance, wherein a light-diffusion plate or a plurality of grooves in the surface of the reflective electrode are required, thereby increasing the incident surface and transmission area of the light. Second, when using the light-diffusion plate or the reflective electrode having the grooves, it is impossible to form a ultra-thin LCD device and manufacturing processing steps are complicated. Third, since the color filter layer absorbs the light, the luminance is lowered due to the low light efficiency.

SUMMARY OF THE INVENTION

Accordingly, the present invention is directed to a reflection-type LCD device and a method of fabricating a reflection-type LCD device that substantially obviates one or more problems due to limitations and disadvantages of the related art.

An object of the present invention is to provide a reflection-type LCD device and a method of fabricating a reflection-type LCD device that has a simplified structure and improves light efficiency.

Additional features and advantages of the invention will be set forth in the description which follows, and in part will be apparent from the description, or may be learned from practice of the invention. The objectives and other advantages of the invention will be realized and attained by the structure particularly pointed out in the written description and claims hereof as well as the appended drawings.

To achieve these objects and other advantages and in accordance with the purpose of the invention, as embodied and broadly described herein, a reflection-type liquid crystal display (LCD) device includes lower and upper substrates facing each other, a color filter layer including a plurality of photonic crystal balls on the lower substrate for reflecting light having specific wavelengths, gate and data lines on the upper substrate crossing each other to define a pixel region, a thin film transistor at a crossing point of the gate and data lines, a pixel electrode within the pixel region electrically connected to the thin film transistor, and a liquid crystal layer between the lower and upper substrates.

In another aspect, a reflection-type liquid crystal display (LCD) device includes lower and upper substrates facing each other, a color filter layer including a plurality of photonic crystal balls on the lower substrate for reflecting light having specific wavelengths, gate and data lines on one of the lower and upper substrates crossing each other to define a pixel region, a thin film transistor at a crossing point of the gate and data lines, a pixel electrode within the pixel region electrically connected to the thin film transistor, and a liquid crystal layer between the lower and upper substrates.

In another aspect, a reflection-type liquid crystal display (LCD) device includes lower and upper substrates facing each other, a color filter layer including a plurality of photonic crystal balls on the lower substrate for reflecting light having specific wavelengths, a thin film transistor array including a gate line, a data line, and a pixel electrode on one of the upper substrate and the color filter layer of the lower substrate, and a liquid crystal layer between the lower and upper substrates.

In another aspect, a method of fabricating a reflection-type liquid crystal display (LCD) device includes forming a plurality of gate lines and gate electrodes on an upper substrate, forming a gate insulating layer along an entire surface of the upper substrate, forming a plurality of data lines on the gate insulating layer perpendicular to the gate lines, forming a plurality of thin film transistors on the upper substrate, each thin film transistor including a gate electrode, a source electrode, and a drain electrode, forming a passivation layer along an entire surface of the upper substrate including a plurality of contact holes exposing a portion of the drain electrodes, forming a plurality of transparent pixel electrodes on the passivation layer, forming a color filter layer on a lower substrate, the color filter layer including a plurality of photonic crystal balls mixed with resin material, bonding the upper and lower substrates together, and forming a liquid crystal layer between the upper and lower substrates, wherein the color filter includes first color filter layers reflecting a first wavelength corresponding to a red color, second color filter layers reflecting a second wavelength corresponding to a green color, and third color filter layers reflecting a third wavelength corresponding to a blue color.

In another aspect, a method of fabricating a reflection-type liquid crystal display (LCD) device includes forming a plurality of gate lines and data lines on a lower substrate, forming a plurality of thin film transistors on the lower substrate, forming a plurality of transparent pixel electrodes connected to the plurality of thin film transistors, forming a color filter layer on the lower substrate, the color filter layer including nano-particles having first, second, and third diameters for producing red, green, and blue colored light, respectively, forming a plurality of light-shielding layers on an upper substrate corresponding to the plurality of thin film transistors, bonding the upper and lower substrates together, and forming a liquid crystal layer between the upper and lower substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
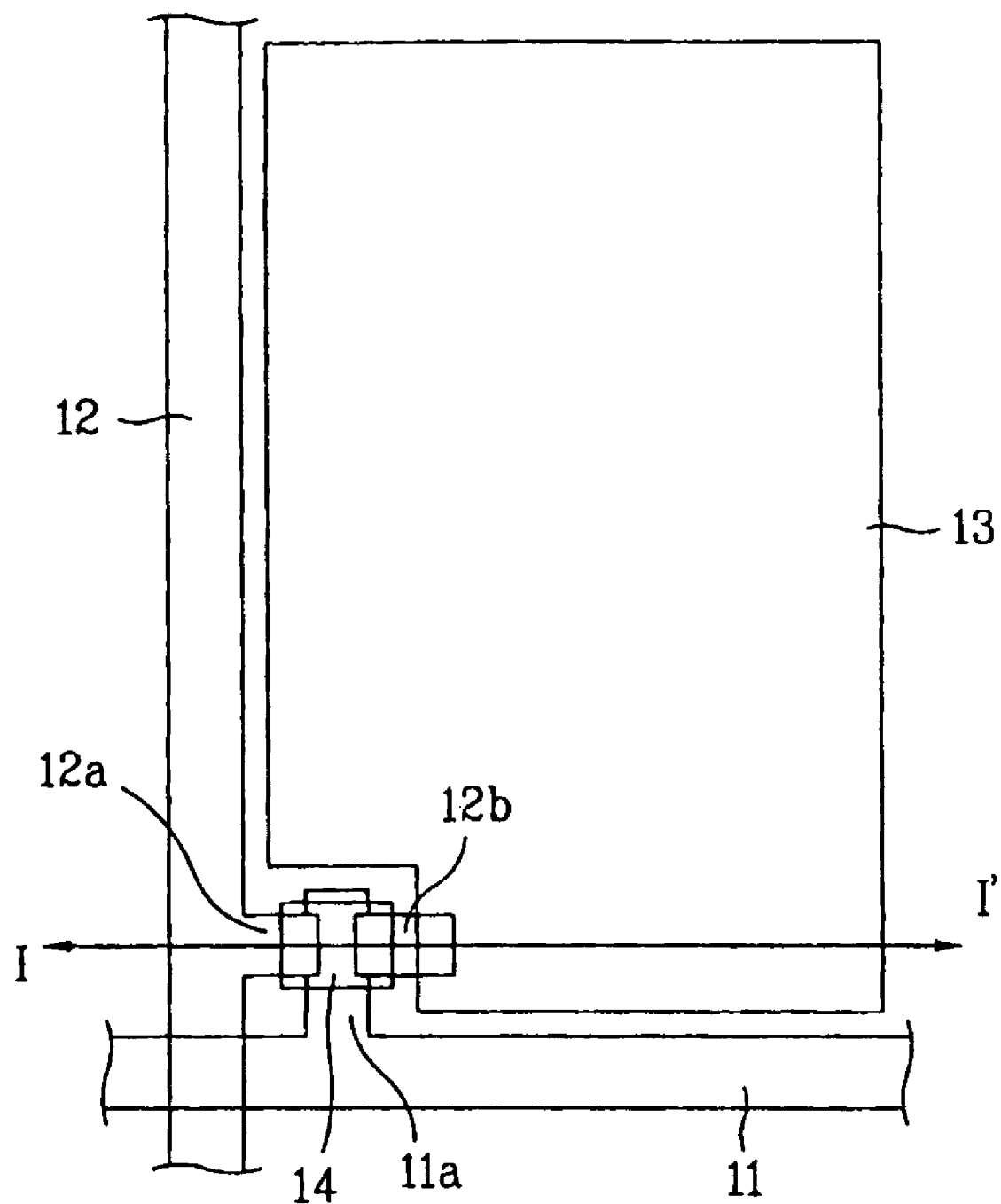
FIG. 1 is a plan view of a reflection type LCD device according to the related art.
Figure 2:
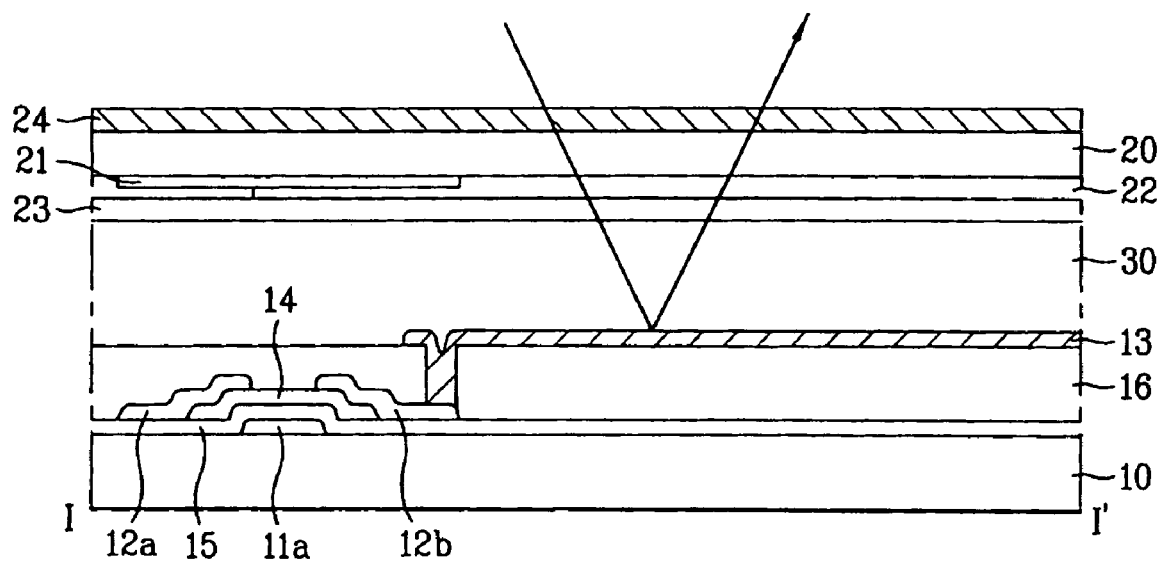
FIG. 2 is a cross sectional view along I-I' of FIG. 1 according to the related art.
Figure 3:
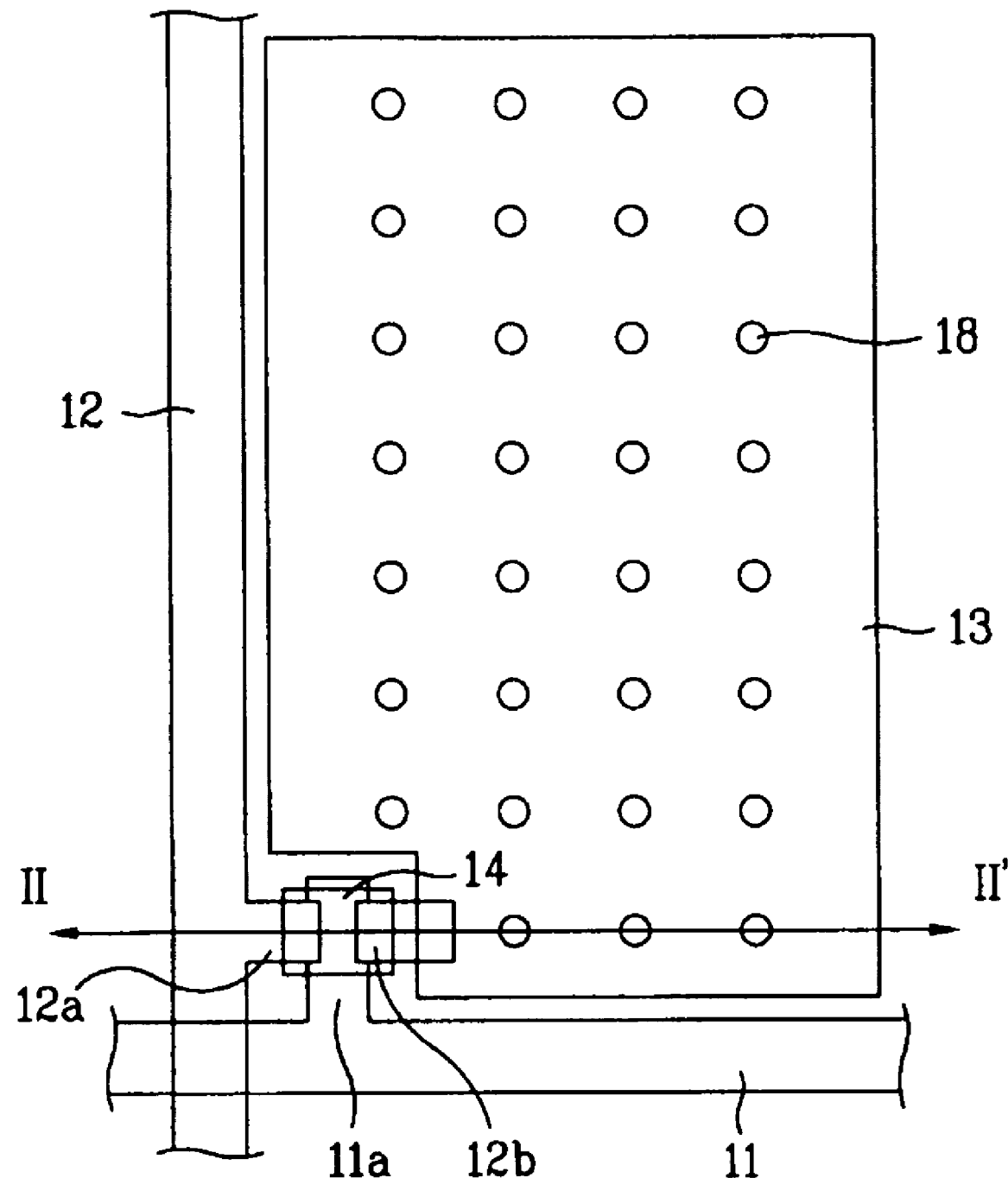
FIG. 3 is a plan view of another reflection-type LCD device according to the related art.
Figure 4:
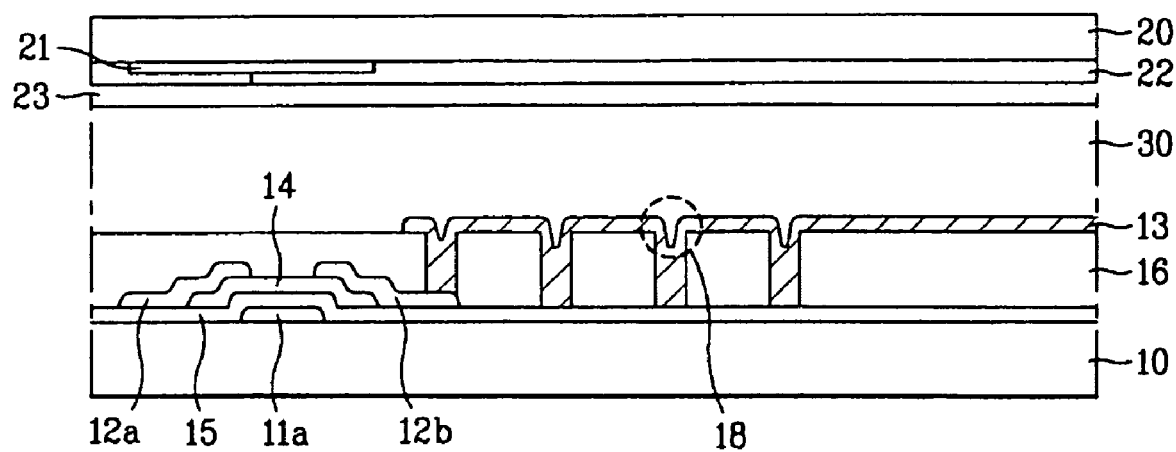
FIG. 4 is a cross sectional view along II-II' of FIG. 3 according to the related art.
Figure 5:
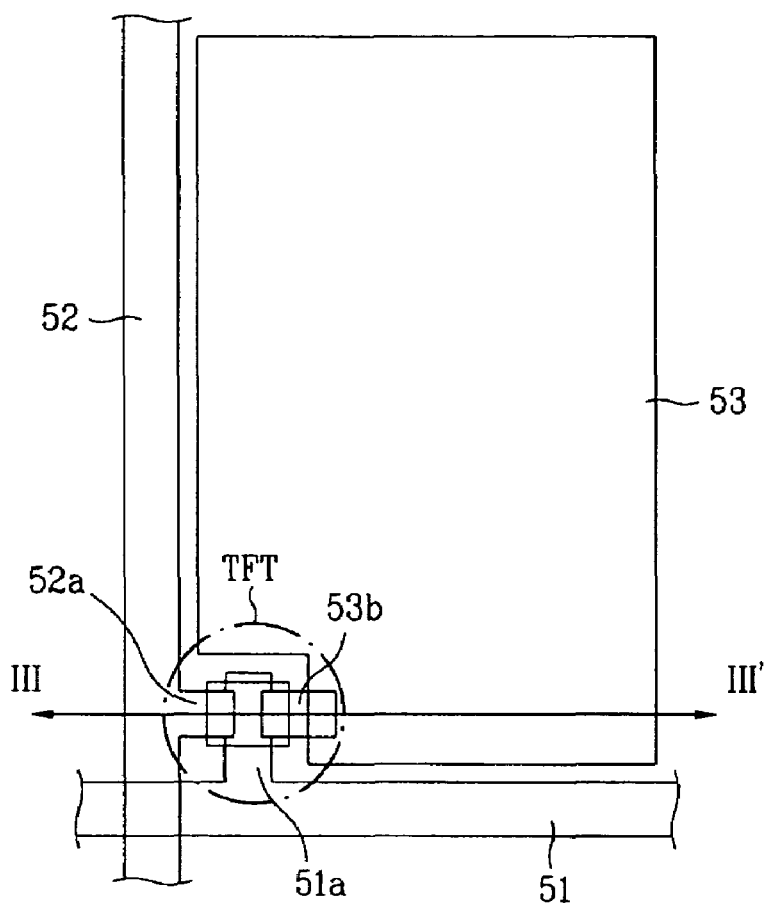
FIG. 5 is a plan view of an exemplary reflection-type LCD device according to the present invention.
Figure 6:
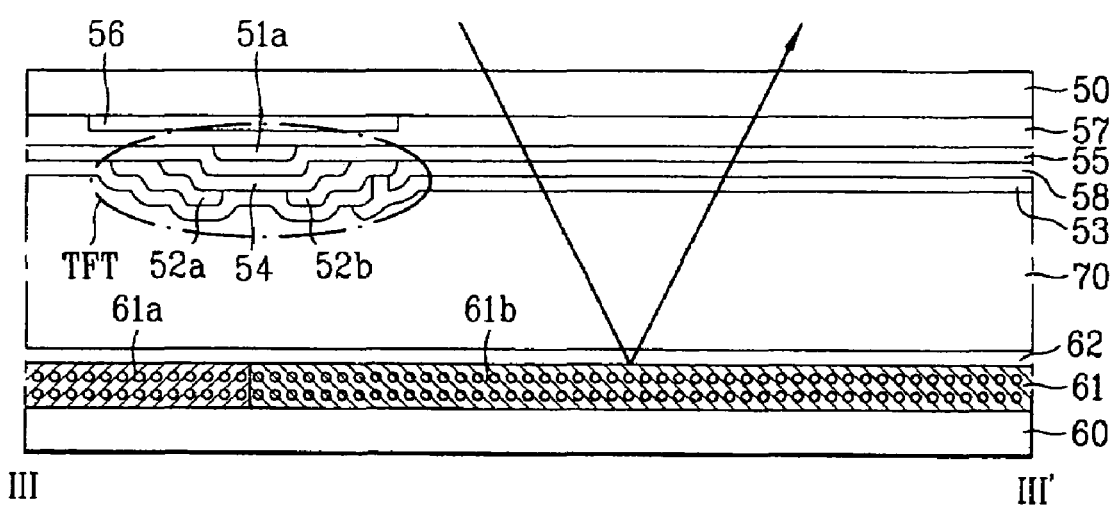
FIG. 6 is a cross sectional view along III-III' of FIG. 5 according to an exemplary embodiment of the present invention.
Figure 7:
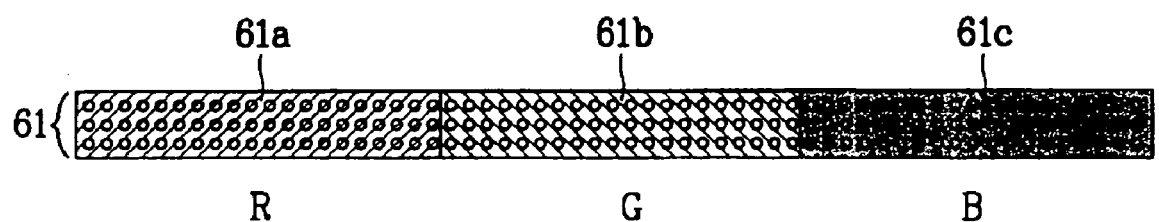
FIG. 7 is a cross sectional view of an exemplary color filter of FIG. 6 according to the present invention.
Figure 8:
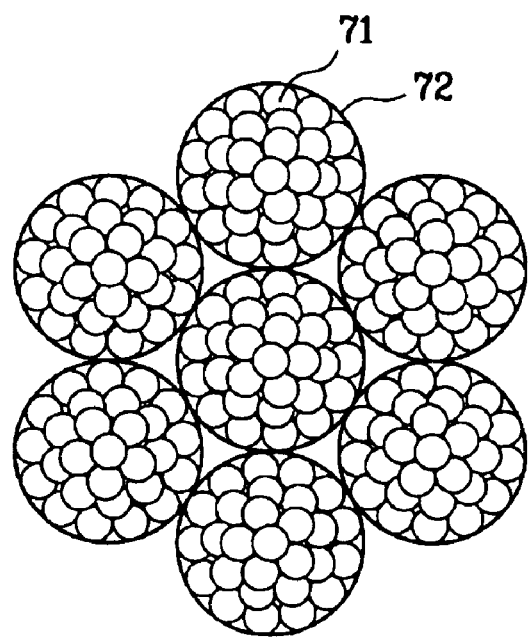
FIG. 8 is a layout view of exemplary photonic crystal balls according to the present invention.

FIG. 5 is a plan view of an exemplary reflection-type LCD device according to the present invention, FIG. 6 is a cross sectional view along III-III' of FIG. 5 according to an exemplary embodiment of the present invention, FIG. 7 is a cross sectional view of an exemplary color filter of FIG. 6 according to the present invention, and FIG. 8 is a layout view of exemplary photonic crystal balls according to the present invention.

In FIG. 5, a reflection-type LCD device may include gate and data lines 51 and 52 crossing each other on an upper substrate 50 (in FIG. 6) or on a lower substrate 60 (in FIG. 6) to define a pixel region, a pixel electrode 53 within the pixel region, and a thin film transistor having a gate electrode 51a, a semiconductor layer 54, and source/drain electrodes 52a and 52b at a crossing point of the gate and data lines 51 and 52.

Accordingly, the thin film transistor may function as a switching device, wherein data signals may be supplied to the pixel electrode 53 according to scan signals supplied to the gate electrode 51a. In addition, the pixel electrode 53 may be formed of a transparent electrode material, such as indium-tin-oxide (ITO) or indium-zinc-oxide (IZO), whereby external light may be transmitted through the pixel electrode 53.

FIG. 6 is a cross sectional view along III-III' of FIG. 5 according to an exemplary embodiment of the present invention. In FIG. 6, the lower substrate 60 may have a color filter layer 61 including a plurality of photonic crystal balls, and a common electrode 62 on the color filter layer 61. The photonic crystal balls may transmit a predetermined color of the light within the respective pixel regions. The upper substrate 50 may include the gate and data lines 51 and 52 crossing each other so as to define the pixel region, the pixel electrode 53 in the pixel region may be electrically connected with the thin film transistor, and a light-shielding layer 56 may be provided for shielding a portion corresponding to the thin film transistor TFT from the light.

In FIG. 7, the color filter layer 61 may be formed of the photonic crystal balls that may include nano-particles 71 (in FIG. 8), each having a predetermined photonic band-gap energy to reflect red (R), green (G), and blue (B) colored lights. Within the color filter layer 61, the photonic crystal balls may be mixed with resin material(s) having specific viscosity.

In FIG. 8, the color filter layer 61 may be formed by a method of mixing the plurality of photonic crystal balls 72 with the resin material(s). The photonic crystal balls 72 may each include the nano-particles 71 each having different diameters. Accordingly, it may be possible to reflect the light according to wavelength bands of the R, G, and B light. For example, the photonic crystal ball 72 reflecting the red R light may be formed of the nano-particle 71 having a diameter of about 305 nm, which may be one-half of about 610 nm that is the wavelength of the red R light. According to Bragg's Equation (sin θ=λ/2d), when the light has an incident angle (θ) of 90°, the particle having the diameter corresponding to the half of the wavelength (λ) of the incident light may totally reflect the light. Thus, since the wavelength λ of the red R light is about 610 nm, then the nano-particle 71 having the diameter (d) of about 305 nm may be used for total reflection of the red light.

Similarly, the photonic crystal ball 72 reflecting the green (G) light may be formed of the nano-particle 71 having a diameter of about 275 nm. For example, the diameter of the nano-particle may be one-half of about 550 nm that is the wavelength of the green (G) light. Moreover, the photonic crystal ball 72 reflecting the blue (B) light may be formed of the nano-particle 71 having a diameter of about 240 nm. For example, the diameter of the nano-particle may be one-half of about 480 nm that is the wavelength of the blue (3) light. Thus, diameters of the nano-particles 71 may correspond to one-half of the corresponding wavelength of the desired color of light to be produced. In addition, the nano-particles 71 may have diameters within a range of about ±10 corresponding to the one-half values of the wavelength of the desired color light to be produced. Furthermore, the photonic crystal balls 72 may be formed of metallic material(s) or of resin material(s), such as acrylic resin(s).

In FIG. 7, the first color filter layer 61a may be formed of the photonic crystal balls 72 of the nano-particles 71 having diameters of about 305 nm (i.e., about 295 nm to about 315 nm), the second color filter layer 61b may be formed of the photonic crystal balls 72 of the nano-particles 71 having diameters of about 275 nm (i.e., about 265 nm to about 285 nm), and the third color filter layer 61c may be formed of the photonic crystal balls 72 of the nano-particles 71 having diameters of about 240 nm (i.e., about 230 nm to about 240 nm).

An exemplary method of fabricating the reflection-type LCD device shown in FIGS. 5-8 may include steps of forming a light-shielding layer 56 on the upper substrate 50 to cover a portion corresponding to the thin film transistor. In addition, it may be possible to form the light-shielding layer 56 above the thin film transistor after forming the thin film transistor. Then, a flattening layer 57 may be formed along an entire surface of the upper substrate 50 including the light-shielding layer 56.

Next, a metal layer having high conductivity may be formed on the upper substrate 50, and may be processed using photolithographic steps to form the plurality of gate lines 51. When forming the gate lines 51, the gate electrodes 51a may be formed to protrude from the respective gate lines 51 at portions corresponding to the thin film transistors.

Then, a gate insulating layer 55 may be formed along an entire surface of the upper substrate 50 including the gate lines 51 and the gate electrodes 51a. Next, an amorphous silicon layer or a polysilicon layer may be formed above the gate insulating layer 55 using photolithographic processes to form the island-shaped semiconductor layer 54.

Next, a metal layer having a high conductivity may be formed on the gate insulating layer 55 including the semiconductor layer 54, and may be selectively removed to form the data lines 52 perpendicular to the gate lines 51. Simultaneously, the source and drain electrodes 52a and 52b may be formed at both sides of the semiconductor layer 54. In addition, the source electrode 52a may protrude from the data line 52, and the drain electrode 52b may be formed at a predetermined interval from the source electrode 52a.

Next, a passivation layer 58 may be deposited along an entire surface of the upper substrate 50, and may be selectively removed to form a contact hole exposing a portion of the drain electrode 52b. Subsequently, a transparent conductive layer, such as indium-tin-oxide (ITO) or indium-zinc-oxide (IZO), may be formed along an entire surface of the passivation layer 58, and patterned to remain on the pixel region. Accordingly, the pixel electrode 53 may be formed to be connected to the drain electrode 52b through the contact hole.

Then, the color filter layer 61 may be formed on the lower substrate 60 facing the upper substrate 50. As shown in FIG. 7, the color filter layer 61 may be formed by a method including mixing the photonic crystal balls 71 with the resin material(s) having a specific viscosity, thereby forming the first, second, and third color filter layers 61a, 61b, and 61c. As previously described above, the photonic crystal balls 72 may include the nano-particles 71 having the predetermined photonic band-gap energies to reflect the red (R), green (G), and blue (B) colored lights corresponding to the respective pixel electrodes 53. Furthermore, the photonic crystal balls 72 may include the nano-particles 71 having a diameter of about 305 nm (i.e., about 295 nm to about 315 nm) mixed with the resin material(s). Subsequently, the photonic crystal balls 72 mixed with the resin material(s) may be deposited along an entire surface of the lower substrate 60, and may be selectively removed to form the first color filter layer 61 within the pixel region. By repetition of the aforementioned process, the second color filter layer 61b may be formed of the photonic crystal balls 72 including the nano-particles 71 having a diameter of about 275 nm (i.e., about 265 nm to about 285 nm), and the third color filter layer 61c may be formed of the photonic crystal balls 72 including the nano-particles 71 having a diameter of about 240 nm (i.e., about 230 nm to about 250 nm).

In FIG. 6, the first, second, and third color filter layers 61a, 61b, and 61c may be separately formed from the portion of the thin film transistor TFT, and may be formed in a connection pattern. However, during patterning of the first, second, and third color filter layers 61a, 61b, and 61c, each of the first, second, and third color filter layers 61a, 61b, and 61c may be partially removed at portions corresponding to the thin film transistor. Then, after bonding the lower and upper substrates 50 and 60 together, a liquid crystal layer 70 may be formed between the lower and upper substrates 50 and 60. Alternatively, the liquid crystal layer 70 may be provided on one of the lower and upper substrates 50 and 60 before bonding.

According to the present invention, light may be transmitted through the pixel electrode 53, and then diffused onto a surface of the color filter layer 61 to produce specific wavelengths of light. Thus, the respective pixel electrodes 53 may transmit the specific wavelengths of the light.

In addition, the first, second, and third color filter layers 61a, 61b, and 61c may reflect the light having the specific wavelengths of the light. For example, light having wavelengths other than the specific wavelength may not be transmitted due to destructive interference. Accordingly, it may be possible to reflect the respective colors of the light at 100% using the nano-particles 71 of the photonic crystal balls 72 in the first, second, and third color filter layers 61a, 61b, and 61c, whereby the color filter layers 61a, 61b, and 61c may function as a light-diffusion plate. In addition, the first, second, and third color filter layers 61a, 61b, and 61c may have uniform reflectance to the respective colors of the light, whereby differences in brightness according to the respective colors of the light may be made uniform.

Figure 9:
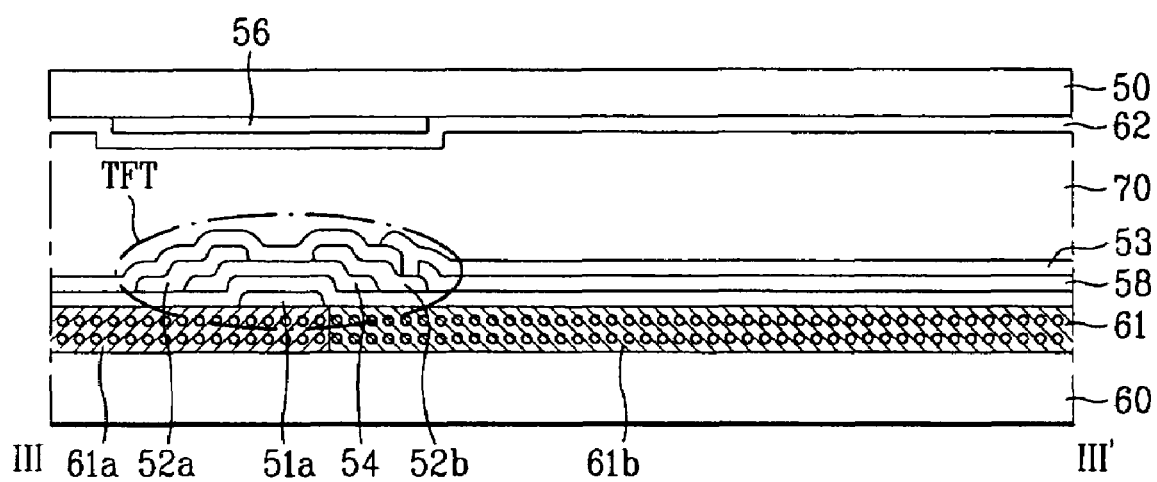
FIG. 9 is a cross sectional view along III-III' of FIG. 5 according to another exemplary embodiment of the present invention.

FIG. 9 is a cross sectional view along III-III' of FIG. 5 according to another exemplary embodiment of the present invention. In FIG. 9, a reflection-type LCD device may differ from the reflection-type LCD device shown in FIG. 6 in that a thin film transistor TFT may be formed on a lower substrate 60. Accordingly, a color filter layer 61 may be positioned below the thin film transistor TFT, whereby light incident through a pixel electrode 53 may be diffused on the color filter layer 61 to obtaining a reflection mode. Thus, a light-shielding layer 56 may be formed on an upper substrate 50 to cover the thin film transistor TFT. And a common electrode 62 may be formed on the upper substrate 50 including the light-shielding layer 56.

Another exemplary method of fabricating the reflection-type LCD device shown in FIG. 9 may include the steps for fabricating the reflection-type LCD device of FIG. 6, except that the thin film transistor TFT may be formed on the lower substrate 60, whereby the same reference numbers will be used throughout the drawing to refer to the same or like parts.

First, the color filter layer 61 may be formed on the lower substrate 50, and then the process for forming the thin film transistor TFT may be performed. As prevously described above, the color filter layer 61 may be formed of photonic crystal balls 72 of nano-particles 71 each having a diameter corresponding to one-half of a specific wavelength of a corresponding color to reflect. That is, the photonic crystal balls 72 including the nano-particles 71 each may have a diameter of about 305 nm (i.e., about 295 nm to about 315 nm) mixed with resin material(s). Then, the photonic crystal balls 72 mixed with the resin material(s) may be deposited along an entire surface of the lower substrate 60, and may be selectively removed to form the first color filter layer 61a. According to repetition of the aforementioned process steps, the second color filter layer 61b may be formed of the photonic crystal balls 72 including the nano-particles 71, each having a diameter of about 275 nm (i.e., about 265 nm to about 285 nm). In addition, the third color filter layer 61c (in FIG. 7) may be formed of the photonic crystal balls 72 including the nano-particles 71, each having a diameter of about 240 nm (i.e., about 230 nm to about 250 nm).

Next, an insulating interlayer (not shown) may be formed along an entire surface of the color filter layer 61. Then, a metal layer having a high conductivity may be formed along an entire surface of the insulating interlayer, and may be selectively removed to form a gate line and a gate electrode 51a. Accordingly, it may not be possible to form the insulating interlayer.

Subsequently, a gate insulating layer 55 may be formed along an entire surface of the lower substrate 60 including the gate electrode 51a and the gate line 51. Then, an amorphous silicon layer or a polysilicon layer may be formed on the gate insulating layer 55 using photolithographic processes, thereby forming an island-shaped semiconductor layer 54 overlapping the gate electrode 51a.

Next, a metal layer having a high conductivity may be formed on the gate insulating layer 55 including the semiconductor layer 54, and may be selectively removed to form a data line 52 perpendicular to the gate line 51. Simultaneously, source/drain electrodes 52a and 52b may be formed at both sides of the semiconductor layer 54. Accordingly, the source electrode 52a may protrude from the data line 52, and the drain electrode 52b may be formed at a predetermined interval from the source electrode 52a.

Then, a passivation layer 58 may be formed along an entire surface of the lower substrate 60, and may be selectively removed to form a contact hole exposing a portion of the drain electrode 52b. In addition, a transparent conductive layer, such indium-tin-oxide (ITO) or indium-zinc-oxide (IZO), as may be formed along an entire surface of the passivation layer 58, and may be patterned to remain within the pixel region. Accordingly, the pixel electrode 53 may be formed to be electrically connected with the drain electrode 52b through the contact hole.

Then, a light-shielding material may be deposited along an entire surface of the upper substrate 50, and may be selectively removed. Accordingly, the light-shielding layer 56 may be formed on the upper substrate 50 at the portion corresponding to the thin film transistor TFT. Subsequently, after bonding the lower and upper substrates 50 and 60 together, a liquid crystal layer 70 may be formed between the lower and upper substrates 50 and 60. Alternatively, a liquid crystal layer may be formed on one of the lower and upper substrates 50 and 60 before bonding.

According to the present invention, the reflection-type LCD device may have the following advantages. First, the color filter layer may be formed to include the photonic crystal balls of the nano-particles to selectively reflect light having specific wavelengths according to a diameter of the nano-particles. Accordingly, if the color filter layer having the photonic crystal balls is used in the reflection-type LCD device, a reflecting plate and a light-diffusion plate may not be necessary. In addition, an ultra-thin reflection-type LCD device may be obtained.

Moreover, the light having the specific wavelengths may be reflected according to the diameter of the nano-particles in the photonic crystal balls of the color filter layer. Thus, it may be possible to reflect the light having the specific wavelength at 100% without absorption of the corresponding wavelengths. In addition, the reflection-type LCD device may have a simplified structure, thereby improving light efficiency due to a relatively short pathway for the light to pass.

Furthermore, the reflection-type LCD device according to the present invention including the color filter layer of the photonic crystal balls having the light-diffusion characteristics may provide for wide viewing angles.

It will be apparent to those skilled in the art that various modifications and variations can be made in a reflection-type LCD device and a method of fabricating a reflection-type LCD device of the present invention. Thus, it is intended that the present invention covers the modifications and variations of this invention provided they come within the scope of the appended claims and their equivalents.

What is claimed is:

1. A reflection-type liquid crystal display (LCD) device, comprising:
    lower and upper substrates facing each other;
    a first color filter layer having first photonic crystal balls on the lower substrate for reflecting a first one of the specific wavelengths corresponding to a red color of light, wherein the first photonic crystal balls are formed of nano-particles having diameters corresponding to one-half of the specific wavelength corresponding to the red color light;
    a second color filter layer having second photonic crystal balls on the lower substrate for reflecting a second one of the specific wavelengths corresponding to a green color of light, wherein the second photonic crystal balls are formed of nano-particles having diameters corresponding to one-half of the specific wavelength corresponding to the green color of light;
    a third color filter layer having third photonic crystal balls on the lower substrate for reflecting a third one of the specific wavelengths corresponding to a blue color of light, wherein the third photonic crystal balls are formed of nano-particles having diameters corresponding to one-half of the specific wavelength corresponding to the blue color of light;
    gate and data lines on one of the lower and upper substrates crossing each other to define a pixel region;
    a thin film transistor at a crossing point of the gate and data lines;
    a pixel electrode within the pixel region electrically connected to the thin film transistor; and
    a liquid crystal layer between the lower and upper substrates,
    wherein the color filter layers including the plurality of photonic crystal balls only reflect incident light.

2. The device according to claim 1, further comprising a light-shielding layer on the upper substrate corresponding to the thin film transistor.

3. The device according to claim 1, wherein the photonic crystal balls of the first color filter layer are formed of nano-particles having diameters within a range of about 295 nm to about 315 nm.

4. The device according to claim 1, wherein the photonic crystal balls of the second color filter layer are formed of nano-particles having diameters within a range of about 265 nm to about 285 nm.

5. The device according to claim 1, wherein the photonic crystal balls of the third color filter layer are formed of nano-particles having diameters within a range of about 230 nm to about 240 nm.

6. The device according to claim 1, wherein one of the first, second, and third color filter layers correspond to the thin film transistor.

7. The device according to claim 1, further comprising a common electrode on one of the lower and upper substrates on which the gate and data lines are not formed.

8. A reflection-type liquid crystal display (LCD) device, comprising:

lower and upper substrates facing each other;

a color filter layer including a plurality of photonic crystal balls on the lower substrate for reflecting light having specific wavelengths, wherein the color filter layer including the plurality of photonic crystal balls only reflects incident light;

a thin film transistor array including a gate line, a data line, and a pixel electrode on one of the upper substrate and the color filter layer of the lower substrate; and a liquid crystal layer between the lower and upper substrates;

a thin film transistor array including a gate line, a data line, and a pixel electrode on the color filter layer of the lower substrate; and a liquid crystal layer between the lower and upper substrates.

* * * * *